May 2, 1950 C. L. BOSSMEYER 2,506,058

ARTICLE FOR FILING FLEXIBLE RECORDING BELTS

Filed Sept. 20, 1944

INVENTOR
Charles L. Bossmeyer
BY
Blair, Curtis & Hayward
ATTORNEYS

Patented May 2, 1950 2,506,058

UNITED STATES PATENT OFFICE 2,506,058

ARTICLE FOR FILING FLEXIBLE RECORDING BELTS

Charles L. Bossmeyer, Stratford, Conn., assignor to Dictaphone Corporation, New York, N. Y., a corporation of New York Application September 20, 1944, Serial No. 555,032

1 Claim. (Cl. 129—16.7)

This invention relates to a method of filing flexible phonograph recording belts and to an article used in connection therewith.

One of the objects of this invention is to provide a method of filing flexible phonograph recording belts which is simple, efficient and thoroughly practical in use. Another object is to provide a method of the above character by the use of which a maximum number of belts may be filed in a minimum of space. Another object is to provide a method of the above character wherein each belt is readily accessible to the user. Another object is to provide a method of the above character which will protect the belts against damage during handling and while they are in the filing cabinet. Another object is to provide an article for use in connection with the filing of flexible recording belts which is simple, practical, and thoroughly durable. Another object is to provide an article of the above character which may be manufactured from light and inexpensive materials. Another object is to provide an article of the above character which will protect the flexible phonograph recording belts from damage during handling and while in the files. Another object is to provide a new and improved method of filing flexible recording belts and a new and improved article for use in connection therewith. Other objects will be in part obvious and in part pointed out hereinafter.

The invention accordingly consists, in the features of construction, combinations of elements, arrangements of parts, and in the several steps and relation and order of each of the same to one or more of the others, all as will be illustratively described herein and the scope of the application which will be indicated in the following claim.

In the accompanying drawing in which is shown one of the various possible embodiments of this invention:

Similar reference characters refer to similar parts throughout the several views of the drawing.

Figures 1, 2, 3:
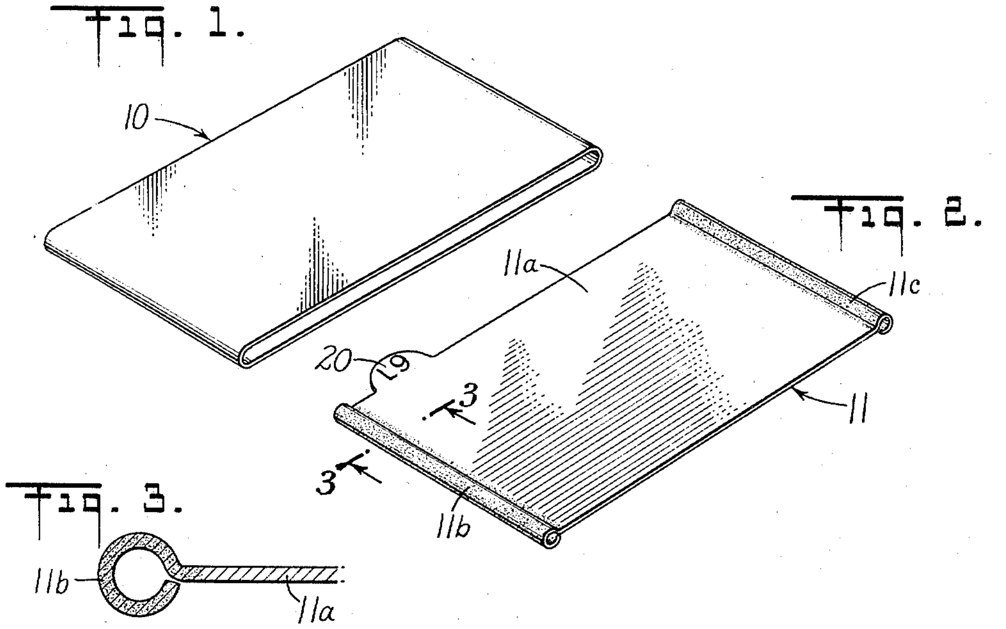
Figure 1 is a perspective view of a flexible phonograph recording belt.
Figure 2 is a perspective view of a filler used in connection with the filing of flexible phonograph recording belts.
Figure 3 is a vertical section on an enlarged scale taken on the line 3—3 of Figure 2.

In Figure 1 a flexible phonograph recording belt is shown, generally indicated at 10. This recording belt is of a type similar to the recording belt shown and described in Patent No. 2,318,828 for a phonograph, which was issued to Yerkovich on May 11, 1943. The belt is of the endless type and is made of a type of material which may be readily acted upon during recording by the stylus of the phonograph. Furthermore, because of its flexibility, the belt may be easily creased if pressure is applied to it when it is in a flattened state. If a belt is creased, the crease may cause the stylus to jump as a recording is played which may cause a part of the recording to be omitted. Furthermore, because of the relatively soft surface of the belts, it is highly important that the belts be protected from abrasion and scratches after a recording has been made on them. It is accordingly another object of this invention to provide a method of filing flexible phonograph recording belts and articles for use in connection therewith which will prevent sharp folds or creases from being formed in them and protect them from abrasion.

Figure 4:
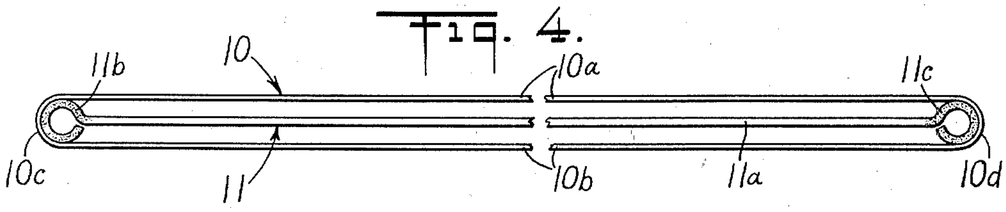
Figure 4 is an end elevation on an enlarged scale showing a belt mounted on the filler shown in Figure 2.

Referring now to the drawings in detail, before filing, flexible phonograph recording belt 10 is mounted on a filler, generally indicated at 11. The filler is made of medium weight manila board and includes a rectangular shaped center section 11*a* having a pair of rolls 11*b* and 11*c* (Figure 2) formed on its ends. In manufacture, after the rolls are formed on the ends of a filler, the rolls are dipped in an impregnating solution which hardens to form a smooth external surface on the rolls and stiffens them so that they cannot be crushed unless considerable force is applied to them. A filler is of sufficient length so that when it is positioned within a recording belt, the recording belt is extended into an oval shape (Figure 4) with its sides 10*a* and 10*b* substantially in alignment with the center portion 11*a* of the filler and its ends 10*c* and 10*d* in contact with the rolls 11*b* and 11*c*. When a recording belt is thus mounted on a filler, it is protected from creasing as the rolls support the portions of the belt in contact with them and thus prevent these portions from being creased even though considerable pressure is exerted upon them. If pressure is exerted upon the belt in its center portion when it is mounted on a filler, this portion is merely pressed downwardly into contact with the filler. Accordingly, when a belt is mounted on a filler, the belt is protected at all times against having creases formed in it.

Figure 5:
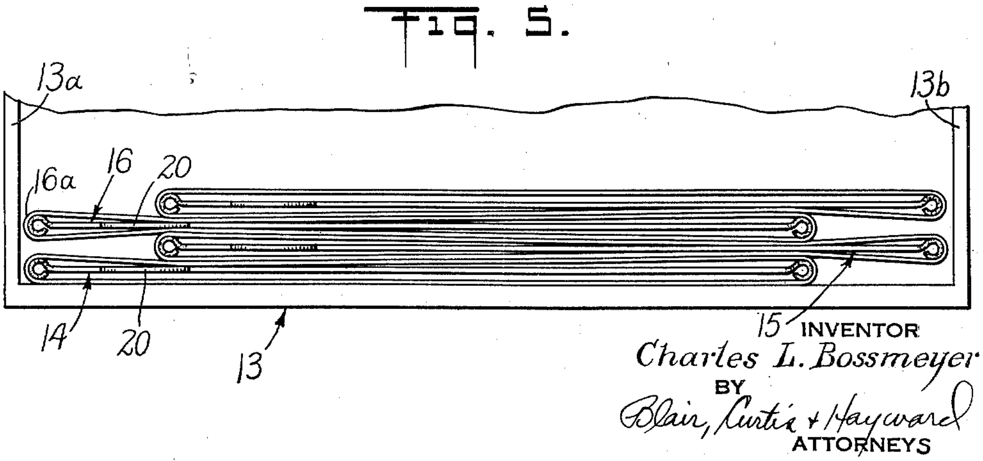
Figure 5 is a top plan view of a portion of a filing cabinet drawer showing the manner in which the flexible phonograph recording belts are filed.

Referring to Figure 5, the method of filing flexible recording belts mounted on fillers is shown. The file drawer, generally indicated at 13, has greater width than the length of a filler. Accordingly, when a filler 14 having a recording belt mounted thereon is placed in the drawer in a vertical position with one of its rolled ends adjacent the side 13*a* of file drawer 13, the other rolled end of the filler is spaced a substantial distance from the opposite side wall 13*b* of drawer 13. When the next filler 15 with its belt is placed in the file drawer parallel to filler 14, it is placed in offset or staggered relationship to filler 14 so that one of its rolled ends is adjacent wall 13*b* and its other rolled end is spaced from wall 13*a*. The next filler 16 with its belt is placed in the file drawer so that it is offset with respect to filler 15 and its rolled end 16*a* is adjacent drawer wall 13*a*. This method of filing is continued until the file drawer is filled and thus each filler with its belt is offset with respect to the fillers and belts adjacent to it. By thus filing the recording belts, it will be noted that the rolled ends of each filler are provided with pockets within which they fit, thus permitting a maximum of fillers with their belts to be filed in one drawer as the rolls of adjacent fillers are not in alignment with each other. To identify the recordings, each filler is provided with a tab, such as tab 20 (Figure 2), which may be formed on each filler when it is made. The tabs provide a space on which identification means may be placed so that each filler and its belt may be readily identified whether it is in or out of the files. It will be appreciated that the tab need not be located exactly as shown and that it may be wider, narrower, or otherwise differently shaped than the tab 20 as shown, limited only in that it will always lie intermediate the extensions of rolls 11*b* and 11*c*.

When the fillers with the belts thereon are filed, as described hereinabove, longitudinal pressure exerted within the drawers, such as may occur when a belt is being removed from a drawer, cannot crease any of the other belts in the drawer as each belt is protected by its filler. Also the effect of such pressure is substantially reduced by the fact that the placing of fillers in staggered relationship with respect to each other has a cushioning effect which absorbs such pressures. Because of the interlocking relationship of the belts with respect to each other, movement between the belts while in the file drawer is prevented, thus reducing abrasion of the belts to a minimum. If desired, more than one belt may be mounted upon a filler, thus increasing the capacity of a file drawer.

Accordingly, it will be seen that a new and improved method of filing flexible phonograph recording belts has been described which prevents them from being damaged both during handling and when they are filed. Furthermore, a filler has been described for use in connection with each belt, which is inexpensive to manufacture and which protects a belt mounted on it from having sharp creases or folds formed in it. Thus it will be seen that a practical and efficient method of filing flexible phonograph recording belts has been disclosed, together with practical and durable filler for use in connection therewith.

As many possible embodiments may be made of the mechanical features of the above invention, and as the art herein described might be varied in various parts, all without departing from the scope of the invention, it is to be understood that all matter hereinbefore set forth or shown in the accompanying drawing is to be interpreted as illustrative and not in a limiting sense.

I claim:

An endless-belt-type phonograph record support embodying a pair of spaced opposite end portions and a generally rectangular intermediate portion extending between said end portions and normally holding them in spaced relationship; each end portion defining an outwardly facing substantially semi-cylindrical supporting surface, the axes of said supporting surfaces being disposed in substantially parallel relationship, said semi-cylindrical supporting surfaces normally subtending therebetween a hypothetical elongated straight-sided oval-like figure of predetermined perimeter, said intermediate portion being resiliently flexible about a bending axis parallel to the axes of said supporting surfaces, said intermediate portion incorporating a tab extending sidewardly therefrom, and said tab presenting a readily visible area available to receive classification information.

CHARLES L. BOSSMEYER.

REFERENCES CITED

The following references are of record in the file of this patent:

UNITED STATES PATENTS

| Number | Name | Date |
|---|---|---|
| 1,029,459 | Quigley | June 11, 1912 |
| 1,285,760 | MacDonagh | Nov. 26, 1918 |
| 1,861,274 | Hopkins | May 31, 1932 |
| 2,021,950 | Thomas | Nov. 26, 1935 |
| 2,084,238 | Best | June 15, 1937 |
| 2,326,241 | Martin | Aug. 10, 1943 |

FOREIGN PATENTS

| Number | Country | Date |
|---|---|---|
| 2,542 | Great Britain | 1867 |
| 407,588 | Great Britain | Mar. 22, 1938 |
| 516,842 | Germany | 1931 |